US012652089B2

(12) United States Patent
Henry et al.

(10) Patent No.: US 12,652,089 B2
(45) Date of Patent: Jun. 9, 2026

(54) ARRAY ANTENNA AND SYSTEM AND METHOD FOR ELEMENT CONFIGURATION IN ARRAY

(71) Applicants: Samer Henry, Toronto (CA); Ahmed Alsohaily, Riyadh (SA)

(72) Inventors: Samer Henry, Toronto (CA); Ahmed Alsohaily, Riyadh (SA)

( * ) Notice: Subject to any disclaimer, the term of this patent is extended or adjusted under 35 U.S.C. 154(b) by 245 days.

(21) Appl. No.: 18/365,728

(22) Filed: Aug. 4, 2023

(65) Prior Publication Data

US 2023/0379023 A1 Nov. 23, 2023

Related U.S. Application Data

(63) Continuation of application No. PCT/CA2022/050164, filed on Feb. 4, 2022.
(Continued)

(51) Int. Cl.
*H04B 7/06* (2006.01)
*H01Q 21/00* (2006.01)
(Continued)

(52) U.S. Cl.
CPC ........... *H04B 7/0608* (2013.01); *H01Q 21/06* (2013.01); *H04B 7/0413* (2013.01)

(58) Field of Classification Search
None
See application file for complete search history.

(56) References Cited

U.S. PATENT DOCUMENTS

| 10,886,963 B2 * | 1/2021 | Sengupta | .............. H04B 1/0458 |
| 2018/0301818 A1 * | 10/2018 | Welle | ....................... G01S 13/88 |

(Continued)

FOREIGN PATENT DOCUMENTS

| CN | 107490791 A | * | 12/2017 | ............... G01S 7/42 |
| CN | 110545132 A | * | 12/2019 | ........... H04B 7/0617 |

(Continued)

OTHER PUBLICATIONS

International Search Report for PCT application No. PCT/CA2022/050164, CIPO, search completed: Apr. 6, 2022, mailed: May 16, 2022.
Written Opinion of the International Searching Authority for PCT application No. PCT/CA2022/050164, CIPO, opinion completed: Apr. 8, 2022, mailed: May 16, 2022.

*Primary Examiner* — Mohammed Rachedine
(74) *Attorney, Agent, or Firm* — Sigma Law Group LLC; James Smedley; Alex Korona

(57) ABSTRACT

There is provided an array antenna and a system and a method for element configuration in an array antenna. The antenna elements are determined to be active based on meeting constraints, including at least one of: for concave portions of the surface, a maximum slope difference between active antenna elements is less than a predetermined value; a maximum element spacing between active antenna elements is greater than or equal to half a wavelength of a signal propagating or received at the respective antenna elements; and for antenna elements grouped into subarrays that each transmit a unique data stream, the number of subarrays being between two and a maximum number of subarrays, the maximum number of subarrays comprising a total number of antenna elements that provide multiple-input and multiple-output (MIMO) operation for multiple locations.

18 Claims, 8 Drawing Sheets

Related U.S. Application Data

(60) Provisional application No. 63/199,971, filed on Feb. 5, 2021.

(51) Int. Cl.
    *H01Q 21/06*      (2006.01)
    *H04B 7/0413*    (2017.01)

(56) References Cited

U.S. PATENT DOCUMENTS

| | | | |
|---|---|---|---|
| 2019/0173177 A1* | 6/2019 | Johansson | H01Q 1/246 |
| 2020/0119785 A1* | 4/2020 | Varatharaajan | H04B 7/0478 |
| 2021/0126669 A1* | 4/2021 | Roberts | H04L 5/14 |
| 2021/0143528 A1* | 5/2021 | Wang | H01Q 1/36 |
| 2021/0202410 A1* | 7/2021 | Liao | H01L 23/66 |

FOREIGN PATENT DOCUMENTS

| | | | | | |
|---|---|---|---|---|---|
| CN | 111541049 A | | 8/2020 | | |
| CN | 111541049 B | * | 5/2021 | | H01Q 21/0087 |
| JP | 2019075814 A | * | 5/2019 | | |
| WO | WO-2017166259 A1 | * | 10/2017 | | H04B 7/086 |
| WO | WO-2018049692 A1 | * | 3/2018 | | H01Q 21/061 |

* cited by examiner

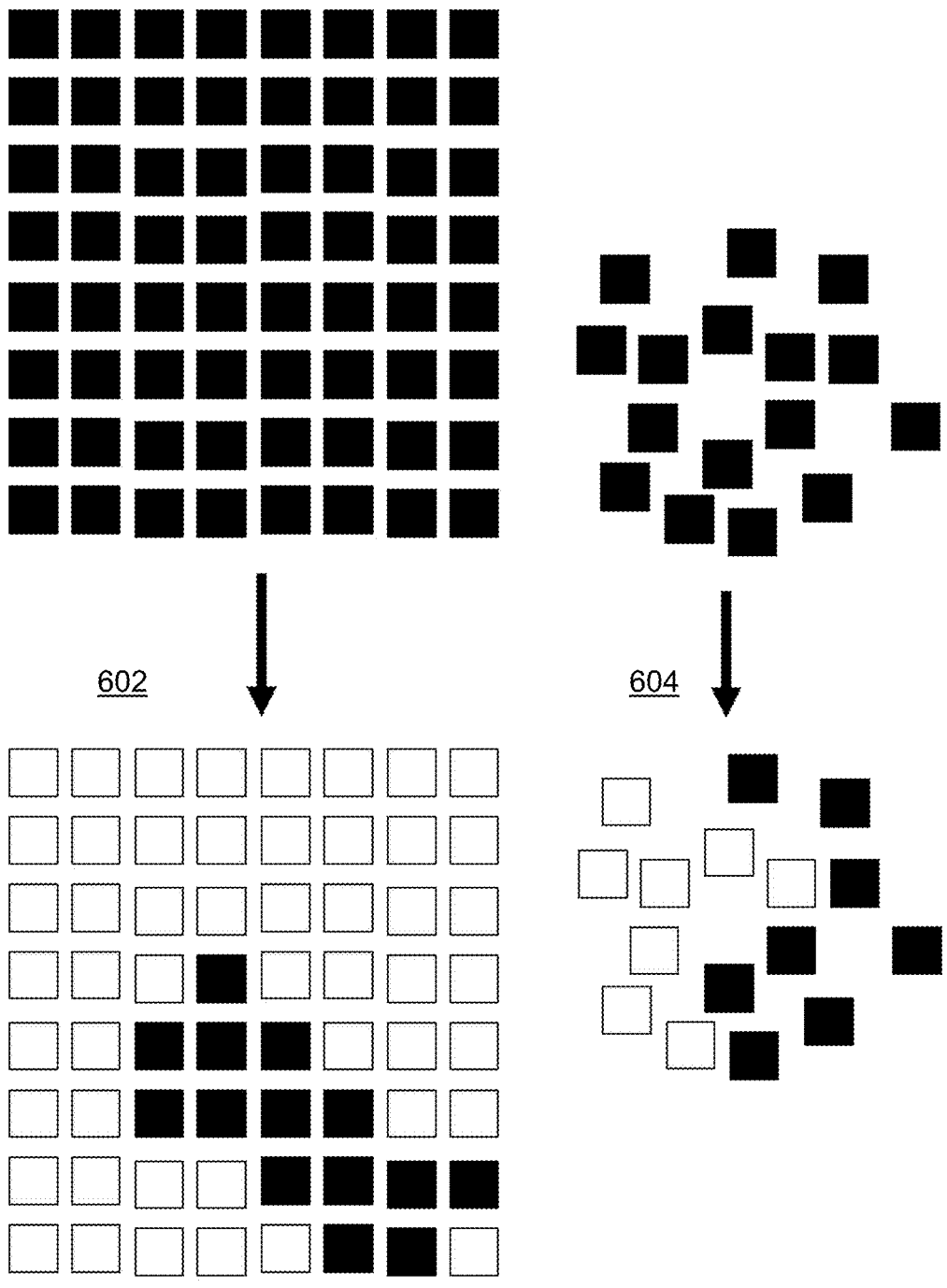
602
604
FIG. 6A     FIG. 6B

ARRAY ANTENNA AND SYSTEM AND METHOD FOR ELEMENT CONFIGURATION IN ARRAY

The following relates generally to wireless communication systems and more specifically to an array antenna and a system and a method for element configuration in an array antenna.

BACKGROUND

Wireless communication systems use antennas to transmit and receive wireless signals carrying data. Advanced technologies, such as Fifth Generation (5G) communication systems, provide a substantial increase in data rates over legacy technologies by utilizing multi-element array antennas to meet system demands for capacity and throughput and to connect a large number of users simultaneously. Furthermore, the use of high frequency bands allows for utilization of more compact array antennas with a large number of elements.

SUMMARY

There is provided an array antenna and a system and a method for element configuration in an array antenna.

In an aspect, there is provided an array antenna comprising a plurality of antenna elements, the antenna elements arranged over a three-dimensional surface, the antenna elements are determined to be active based on meeting constraints, the constraints comprising at least one of: for concave portions of the surface, a maximum slope difference between active antenna elements is less than a predetermined value; a maximum element spacing between active antenna elements is greater than or equal to half a wavelength of a signal propagating or received at the respective antenna elements; and for antenna elements grouped into subarrays that each transmit a unique data stream, the number of subarrays being between two and a maximum number of subarrays, the maximum number of subarrays comprising a total number of antenna elements that provide multiple-input and multiple-output (MIMO) operation for multiple locations.

In a particular case of the antenna array, the three-dimensional surface is synthesized by fitting all the antenna elements according to a polynomial regression.

In another case of the antenna array, the polynomial regression has the form:

$$f(x,y)=c_0+c_1xy+c_2x^2y^2+\ldots+c_px^py^p,$$

and where summing a square of a residual function forms a surface on an x-y plane.

In yet another case of the antenna array, the antenna elements are further determined to be active by: minimizing a spatial correlation between antenna elements; receiving input parameters that are determined from channel state information, from azimuth and elevation angular distribution, and from surface coordinates and orientations of the antenna elements; and reallocating subarray distribution to increase average throughput and capacity based on feedback from a receiver.

In yet another case of the antenna array, the angular distribution is determined based on a unit angle spatial signature.

In yet another case of the antenna array, the constraints are based on inputted values comprising at least one of coordinates of the three-dimensional surface, a number of antenna elements, antenna element coordinates and orientations, environment parameters, and antenna element parameters.

In yet another case of the antenna array, the antenna elements are determined to be active based on fit to constraints by iterative antenna element reduction.

In yet another case of the antenna array, at each iteration, each antenna element is sequentially inactivated and a throughput of the array antenna is determined, the throughput determined by comparison with an initial iteration comprising all antenna elements that meet the constraints, the antenna element having the least decrease in performance when inactivate is selected to be inactivated.

In yet another case of the antenna array, the iterations are terminated when overall performance of the antenna array decreases by a predetermined percentage in comparison to the antenna array with no antenna elements inactivated.

In yet another case of the antenna array, the predetermined value for the maximum slope difference is 1.5.

In anther aspect, there is provided a method for configuring an array antenna, the antenna array comprising a plurality of antenna elements, the antenna elements arranged over a three-dimensional surface, the method executed on a processing unit, the method comprising receiving inputted values, determining a configuration of the antenna elements to be active based on meeting constraints, and outputting the configuration, the constraints comprising at least one of: for concave portions of the surface, a maximum slope difference between active antenna elements is less than a predetermined value; a maximum element spacing between active antenna elements is greater than or equal to half a wavelength of a signal propagating or received at the respective antenna elements; and for antenna elements grouped into subarrays that each transmit a unique data stream, the number of subarrays being between two and a maximum number of subarrays, the maximum number of subarrays comprising a total number of antenna elements that provide multiple-input and multiple-output (MIMO) operation for multiple locations.

In a particular case of the method, the method further comprising synthesizing the three-dimensional surface by fitting all the antenna elements according to a polynomial regression.

In another case of the method, the polynomial regression has the form:

$$f(x,y)=c_0+c_1xy+c_2x^2y^2+\ldots+c_px^py^p,$$

and where summing a square of a residual function forms a surface on an x-y plane.

In yet another case of the method, antenna elements are determined to be active by: minimizing a spatial correlation between antenna elements; receiving input parameters that are determined from channel state information, from azimuth and elevation angular distribution, and from surface coordinates and orientations of the antenna elements; and reallocating subarray distribution to increase average throughput and capacity based on feedback from a receiver.

In yet another case of the method, the angular distribution is determined based on a unit angle spatial signature.

In yet another case of the method, the inputted values comprise at least one of coordinates of the three-dimensional surface, a number of antenna elements, antenna element coordinates and orientations, environment parameters, and antenna element parameters.

In yet another case of the method, the antenna elements are determined to be active based on fit to constraints by iterative antenna element reduction.

In yet another case of the method, at each iteration, each antenna element is sequentially inactivated and a throughput of the array antenna is determined, the throughput determined by comparison with an initial iteration comprising all antenna elements that meet the constraints, the antenna element having the least decrease in performance when inactivate is selected to be inactivated.

In yet another case of the method, the iterations are terminated when overall performance of the antenna array decreases by a predetermined percentage in comparison to the antenna array with no antenna elements inactivated.

In yet another case of the method, the predetermined value for the maximum slope difference is 1.5.

These and other embodiments are contemplated and described herein. It will be appreciated that the foregoing summary sets out representative aspects of certain embodiments to assist skilled readers in understanding the following detailed description.

DESCRIPTION OF THE DRAWINGS

A greater understanding of the embodiments will be had with reference to the Figures, in which:

FIG. 6A illustrates an example of selection and reduction of antenna elements on a uniform 64-element array;

FIG. 6B illustrates an example of selection and reduction of antenna elements on a non-uniform 16-element array;

DETAILED DESCRIPTION

Figure 1:
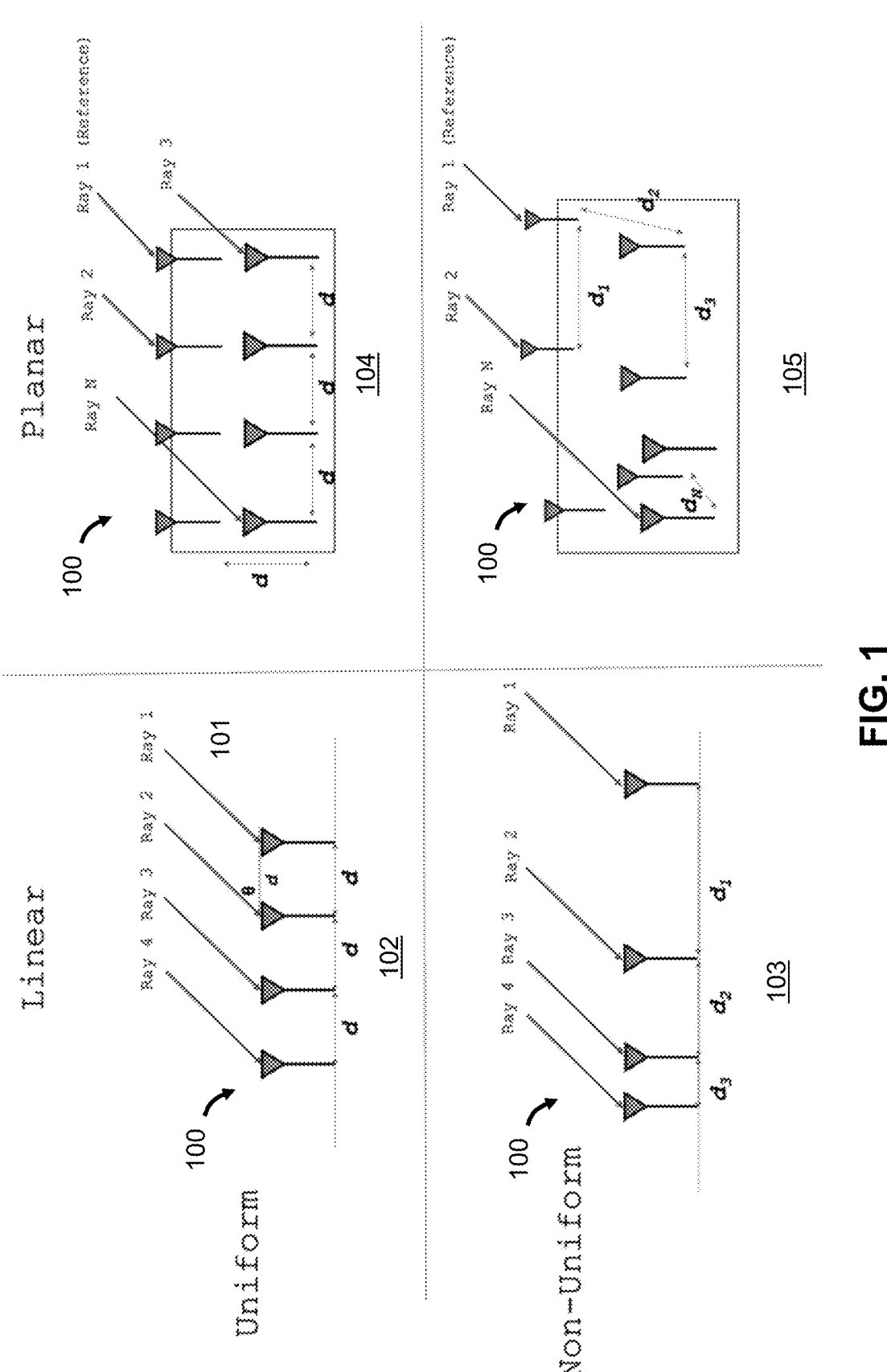
FIG. 1 illustrates examples of linear and two-dimensional antenna array configurations that are uniform or non-uniform.

For simplicity and clarity of illustration, where considered appropriate, reference numerals may be repeated among the Figures to indicate corresponding or analogous elements. In addition, numerous specific details are set forth in order to provide a thorough understanding of the embodiments described herein. However, it will be understood by those of ordinary skill in the art that the embodiments described herein may be practised without these specific details. In other instances, well-known methods, procedures and components have not been described in detail so as not to obscure the embodiments described herein. Also, the description is not to be considered as limiting the scope of the embodiments described herein.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender. Further definitions for terms may be set out herein; these may apply to prior and subsequent instances of those terms, as will be understood from a reading of the present description.

Any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device or accessible or connectable thereto. Further, unless the context clearly indicates otherwise, any processor or controller set out herein may be implemented as a singular processor or as a plurality of processors. The plurality of processors may be arrayed or distributed, and any processing function referred to herein may be carried out by one or by a plurality of processors, even though a single processor may be exemplified. Any method, application or module herein described may be implemented using computer readable/executable instructions that may be stored or otherwise held by such computer readable media and executed by the one or more processors.

Array antennas, which use multiple antenna elements, can be used for high directivity transmissions by grouping antenna elements to maximize the antenna gain in a specific direction for a single transmission. Array elements can also be used for multiple transmissions in Multiple-Input-Multiple-Output (MIMO) configurations which take advantage of various signal paths to simultaneously send multiple data streams. High directivity MIMO configurations can use grouped sets of antenna elements to provide high antenna gains in multiple directions.

In certain approaches to array antennas, elements are placed uniformly or non-uniformly over either a single dimension or over a two-dimensional plane. These configurations reduce the efficiency of array antennas as they receive signals in three dimensional setups and therefore suffer from scan loss when scanning wide angles. This is because the antenna acts as a smaller aperture leading to scan blindness, a major drawback to large arrays. Further, in such configurations, antenna sizes are typically limited; subsequently, increasing the number of elements in an array antenna reduces the distance between antenna elements and introduces antenna coupling or interference between adjacent elements in the array antenna. Various techniques can be used to increase the spacing between elements to reduce coupling, which generally comes at the cost of decreasing transmission or reception power; affecting the range of the array antenna. Generally, this drawback cannot be overcome by increasing the transmission power as that severely decreases system efficiency.

The present embodiments provide three-dimensional uniform or nonuniform antenna element placement configuration for array antennas. Such configurations can provide high directivity for single and MIMO transmissions, wider beamwidth and angular coverage for MIMO transmissions, and are generally free from the limited angle scanning issues found in two-dimensional MIMO arrays. A wider beamwidth can be achieved by turning on elements that are less than a wavelength apart and are useful for beams directed towards wider angular distribution of nearby users. For the purposes of illustration, the present disclosure illustrates a subset of array antenna configurations, such as hemi-spheres and arcs, however other configurations in accordance with the present embodiments can be used. Such configurations enable high-efficiency integrated broad-band systems with multiple directional beams. These configurations offer substantial improvements over one-dimensional or two-dimensional antenna grids with respect to capacity; which is essential for 5G throughput. Moreover, available frequencies in 5G allow more compact antenna element sizes; which can enable affordable high-performance solutions that are aesthetically pleasing on curved surfaces.

The present disclosure provides a subset of antenna configurations, such as hemi-spheres and arcs, for application of the present embodiments; however, the present embodiments can be applied to any suitable configuration conforming to a synthesized surface. In some cases, the antenna elements are distributed into antenna subarrays enabling multiple directional beams. These configurations offer throughput advantages over one or two-dimensional grids, which is advantageous for future connectivity requirements. Higher frequencies enable more compact antenna element sizes, which enable the creation of omni-directional low-volume antenna arrays that can conform to most curved surfaces. The grouping of elements via selection, in the present embodiments, uses an adaptive optimization that depends on the environment and the speed of the antenna. Antenna reduction can also be performed via an adaptive approach that turns less effective elements off, preserving performance using a fraction of the elements.

Embodiments of the present disclosure allow antenna elements to be grouped to provide spatial beams with desired characteristics and beamwidth properties. Beamforming can be less complex than two-dimensional sectored antennas with multiple layers of analysis, and can also be configured to transmit and receive signals using a smaller number of elements; thus increasing power efficiency. Elements can also be grouped to optimize transmitted and received signal power, coverage, beamwidth, and/or spectral efficiency more proficiently than one or two-dimensional arrays. In the present embodiments, the radiating elements can be arranged uniformly or nonuniformly such that, by selectively switching specific elements on, the present system can better align itself with the angle of transmit and generally receive a specific signal regardless of the vertical angle location.

Figure 8:
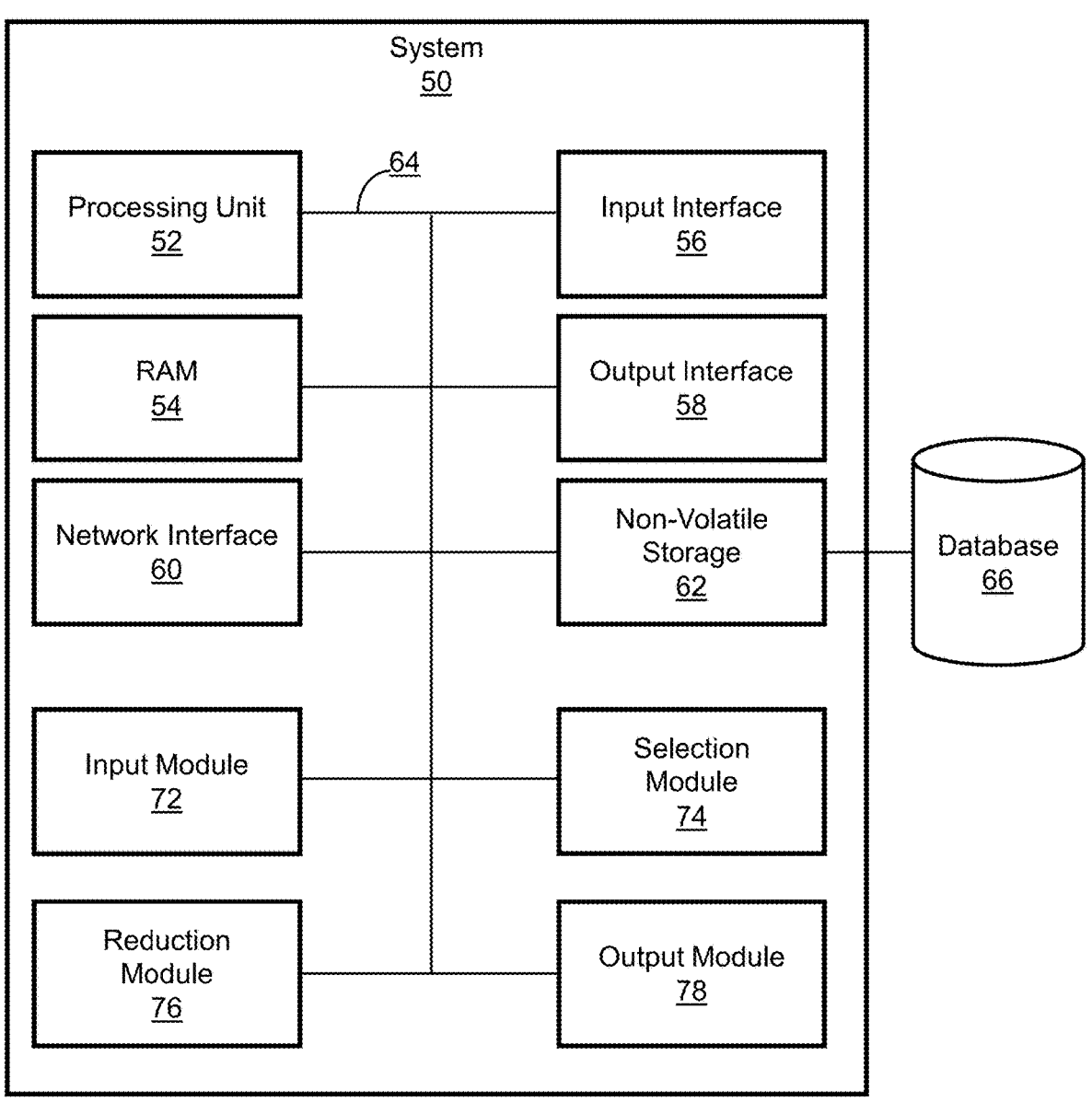
FIG. 8 illustrates a system for performing operations on multi-dimensional functions, in accordance with an embodiment.

Referring now to FIG. 8, a system 50 for performing operations on multi-dimensional functions, in accordance with an embodiment, is shown. In this embodiment, the system 50 is run on a computing device 26 and accesses content located on a server 32 over a network 24, such as the internet. In further embodiments, the system 50 can be run only on the device 26 or only on the server 32 or run and/or distributed on any other computing device; for example, a desktop computer, a laptop computer, a smartphone, a tablet computer, a server, a smartwatch, distributed or cloud computing device(s), or the like. In some embodiments, the components of the system 50 are stored by and executed on a single computer system. In other embodiments, the components of the system 50 are distributed among two or more computer systems that may be locally or remotely distributed.

FIG. 8 shows various physical and logical components of an embodiment of a system 50 element configuration in an array antenna. As shown, the system 50 has a number of physical and logical components, including a processing unit 52 (comprising one or more processors), random access memory ("RAM") 54, an input interface 56, an output interface 58, a network interface 60, non-volatile storage 62, and a local bus 64 enabling processing unit 52 to communicate with the other components. The processing unit 52 can execute or direct execution of various modules, as described below in greater detail. RAM 54 provides relatively responsive volatile storage to the processing unit 52. The input interface 56 enables an administrator or user to provide input via an input device, for example a keyboard and mouse. The output interface 58 outputs information to output devices, for example, a display and/or speakers. The network interface 60 permits communication with other systems, such as other computing devices and servers remotely located from the system 50, such as for a typical cloud-based access model. Non-volatile storage 62 stores the operating system and programs, including computer-executable instructions for implementing the operating system and modules, as well as any data used by these services. Additional stored data, as described below, can be stored in a database 66. During operation of the system 50, an operating system, the modules, and the related data may be retrieved from the non-volatile storage 62 and placed in RAM 54 to facilitate execution.

The system 50 includes one or more conceptual modules configured to be executed by the processing unit 52. In an embodiment, the modules include an input module 72, a selection module 74, a reduction module 76, and an output module 78. In some cases, some of the modules can be run at least partially on dedicated or separate hardware, while in other cases, at least some of the functions of some of the modules are combined or executed on other modules.

FIG. 1 illustrates examples of array antenna configurations in one dimension and two dimensions, uniformly and non-uniformly distributed. Block 102 illustrates an example of an array antenna with antenna elements 100 uniformly distributed in a one dimension axis forming a line; block 103 illustrates an example of an array antenna with antenna elements 100 non-uniformly distributed in a one dimension axis forming a line; block 104 illustrates an example of an array antenna with antenna elements 100 uniformly distributed in a two-dimensional planar surface; and block 105 illustrates an example of an array antenna with antenna elements 100 non-uniformly distributed in a two-dimensional planar surface. In contrast, the present embodiments advantageously provide configurations of non-uniform distributions of elements, within one or more arbitrary surfaces, in three dimensions (3D). Uniform configurations refer to elements with equal separation distances with adjacent elements and equal polarization directions. Non-Uniform configurations refer to elements with non-equal adjacent inter-element spacing. Uniform separation allows for a simplification of the generalized spatial correlation matrix:

$$\phi = \begin{bmatrix} \rho_{11} & \rho_{12} & \cdots & \rho_{1n_R} \\ \rho_{21} & \rho_{22} & & \vdots \\ \vdots & & \ddots & \vdots \\ \rho_{n_R1} & & \cdots & \rho_{n_Rn_R} \end{bmatrix} \tag{1}$$

in which the correlation matrix p contributes to non-linear behavior of a 3D arbitrary antenna array and each element in the 3D space. $\rho_{ii'}$, corresponds to spatial correlation between transmit/receive MIMO elements i and i' in the same array and is a function of the angle of arrival (AoA) and angle of departure (AoD) in both azimuth and elevation, as shown in Equation (2):

$$\rho(d_{ii'}, \theta, \varphi) = \int\limits_{0}^{2\pi} \int\limits_{-\pi}^{\pi} e^{-j\frac{2\pi}{\lambda}d_{ii'}} G(\theta, \varphi)P(\theta, \varphi)d\theta d\varphi \tag{2}$$

in which $\lambda$ is the wavelength, $d_{ii'}$ is the separation distance, $\theta$, $\varphi$ are the elevation and azimuthal angles respectively, $G(\theta,\varphi)$ is the antenna pattern, and $P(\theta,\varphi)$ is the Power Azimuth Spectrum.

The present disclosure provides a closed-form expression for assessing the performance of three-dimensional antenna structures, which reduces the complexity of combining multiple antenna outputs:

$$C = \log_2 det\left(I + \frac{\rho_0}{M} R_{H_0}^R W R_{H_0}^T W^H\right) \tag{3}$$

in which $W \in C^{M \times N}$ is the channel coefficient matrix (M and N are the number of transmit and receive elements respectively) comprising iid Gaussian random variables, $\rho_0$ is the signal-to-interference-noise-ratio, I is the N×N identity matrix $$R_{H_0}^R \text{ and } R_{H_0}^T$$

are the correlation coefficients of the receiving and transmitting antennas respectively for the channel coefficient matrix $H_0$.

The coefficients of $H_0$ are determined for a three-dimensional surface (in this example for a receiver, but can also be applied to a transmitter) by:

$$H_0 = ae^{\frac{-j2\pi d}{\lambda}} \begin{bmatrix} 1 \\ e^{\frac{-j2\pi\Delta_{r2}}{\lambda}\cos\phi_r} \\ e^{\frac{-j2\pi\Delta_{r3}}{\lambda}\sin\theta_r\cos\phi_r} \\ \vdots \\ e^{\frac{-j2\pi\Delta_{rn}}{\lambda}\sin\theta_r\cos\phi_r} \end{bmatrix} \tag{4}$$

in which $\lambda$ is the wavelength, a is the attenuation of the signal path, $\theta_r$ and $\phi_r$ are the receiving elevation and azimuthal incident angles which the receiving path makes with the surface, d is the distance between the reference transmit and receive elements, and $\Delta_{r_n}$ is the separation distance between element n and the reference element (the first element the signal path is incident on). In this way, a simplified closed form expression for the capacity can be formed for a plurality of elements on an arbitrary surface.

An incident wavefront can be received by a reference antenna, which can be referred to as a reference ray. Subsequent incident rays on the array are generally subject to a phase delay depending on the separation distance. Low inter-element spacing introduces higher correlation coefficients and coupling, which are detrimental to the transmit/receive signal.

Linear placement of antenna arrays, as illustrated in blocks 102 and 103, generally simplify complexity for beamforming. The antenna elements 100 could be microstrip patch antennas, flat dual-polarized flat dipoles, or any other suitable type. The antenna elements 100 can be connected via feeding circuits on a substrate on top of a ground plane. Minimal inter-element spacing with respect to the incident and departing waves creates interference that decreases the achievable data rate and capacity. Small inter-element spacing in antenna arrays introduces antenna coupling that fades incoming and departing signals. A feeding circuit can include the electrical elements between the antenna surface and a power amplifier and consist of a conductor connected to the radiating element and an impedance matching with the antenna structure.

Figure 2:
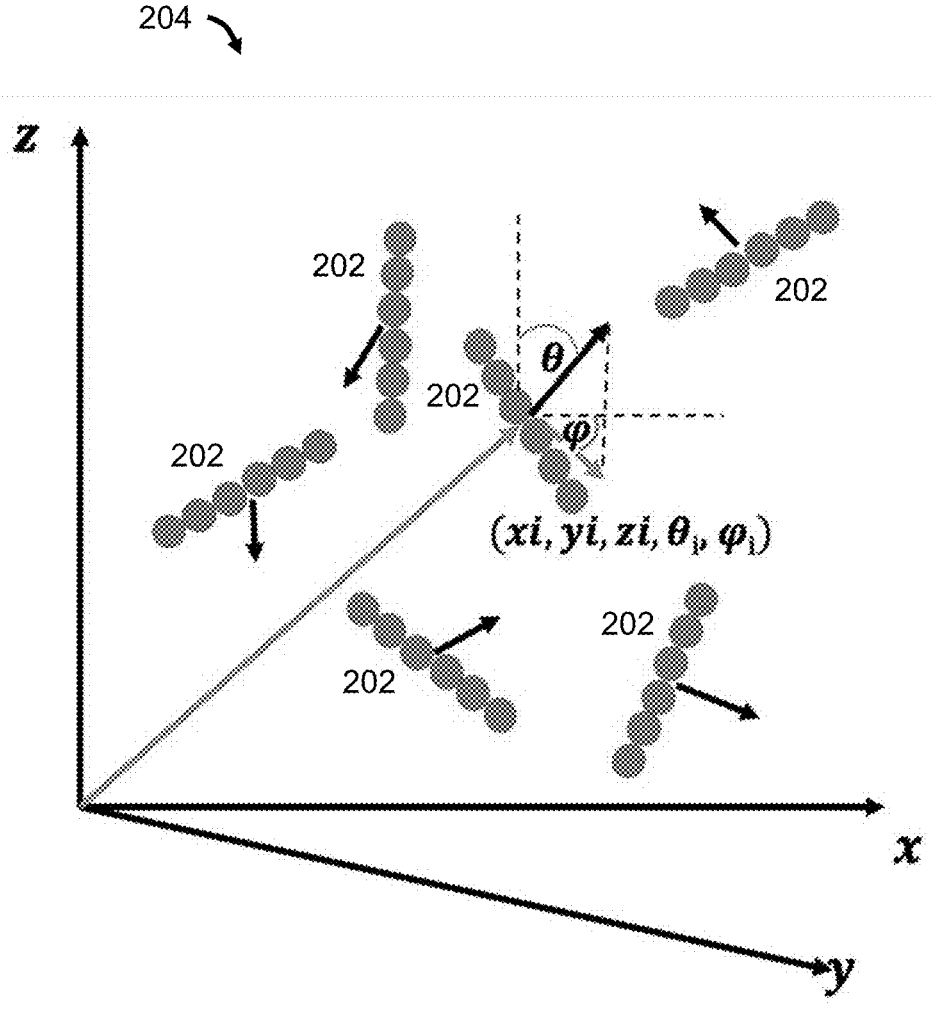
FIG. 2 illustrates an example of antenna element definition with three dimensional cartesian coordinates and with two angles for element orientation.

FIG. 2 illustrates a plurality of antenna elements grouped into antenna arrays 202 spaced out in a three-dimensional subspace 204. In FIG. 2, each antenna element position is defined by respective cartesian coordinates and by a respective orientation defined by two angles: the azimuthal angle with respect to the x-axis, and the elevation angle with respect to the vertical z-axis. Each element can be grouped with a plurality of elements in any configuration that conforms with the surface that the elements are placed on to form an antenna array or one MIMO element. The surface should generally be smooth enough to accommodate the maximum curvature of microstrip patch antennas, and elements should be sufficiently spaced far apart to minimize coupling, while keeping the maximum separation distance nominal to steer the main beam.

Figure 3A:
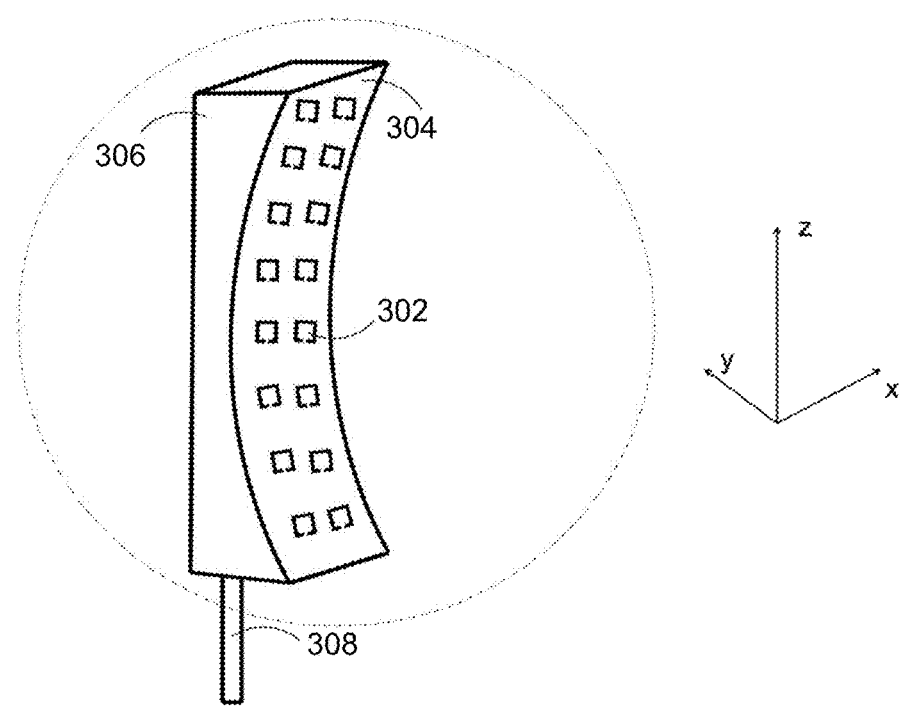
FIG. 3A illustrates an example of a three-dimensional concave-shaped array antenna configuration.
Figure 3B:
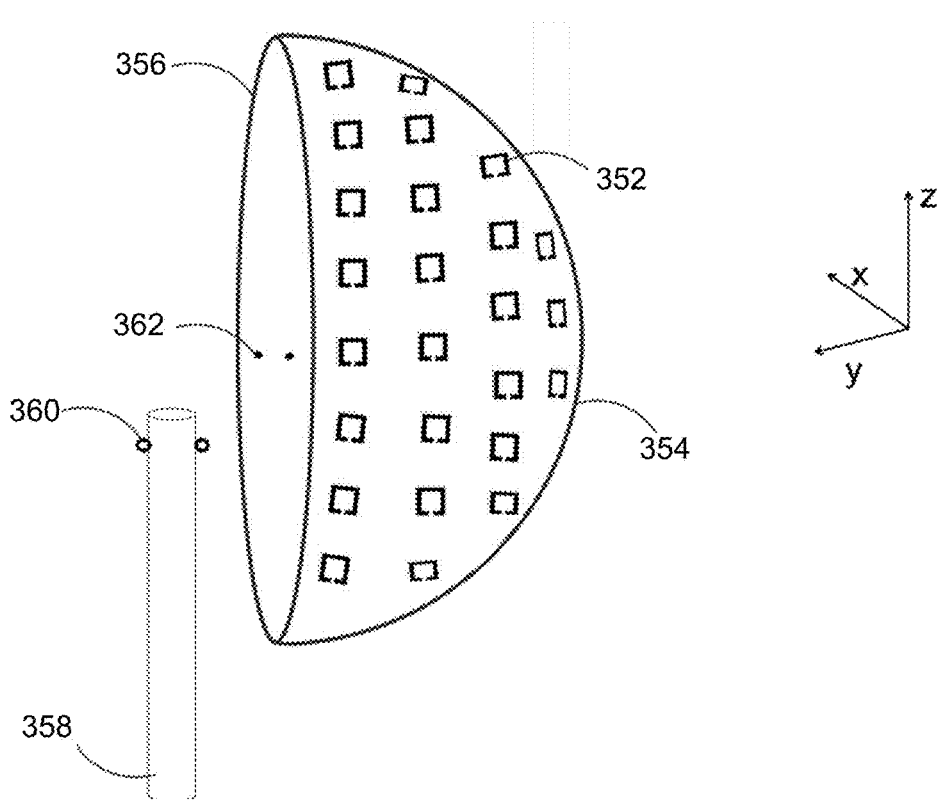
FIG. 3B illustrates an example of a three-dimensional convex-shaped array antenna configuration.

FIGS. 3A and 3B show examples of implementations of array antennas in accordance with the present embodiments. In these examples, a plurality of antenna elements are non-uniformly distributed. Each antenna element 302, 352 can vary in orientation and can comprise, for example, micro-strip patch antennas, flat dual-polarized flat dipoles, or any other suitable antenna type. The antenna elements can have uniform or non-uniform element spacing and uniform or non-uniform element orientation. The elements 302, 352 are placed on a surface 304, 354, having an arbitrary shape. Each element 302, 352 can be defined by spatial coordinates in a three-dimensional Cartesian space and azimuthal and elevation angle denoting its orientation. The surface 304, 354 on which elements are placed can comprise an arbitrary shaped substrate and ground plane that can conform to the curvature and edges of an underlying structure 306, 356. The underlying structure 306, 356 and support 308, 358 can be made of a material that minimizes shielding and antenna coupling for higher frequencies in the overlaying feeding circuit; such as Polyphenylene Ether (PPE) which is heat resistant. Support bolts 360 and fastening points 362 can be used to attach the structure 306, 356 to the support 308, 358. A feeding circuit can provide a separate current switch for each element 302, 352 and uses a control unit for a controlled grouping of elements 302, 352 into an antenna array and can each receive different currents and phase delays. In an example, the control unit can be a field programmable gate array (FPGA) board that manages switching between antenna elements into subarray groupings. A grouping can be managed by an optimization or reduction algorithm that determines subarray selection through an iterative approach that chooses the best possible subarray combination for each location and environment with respect to user distribution. The positioning and orientation of antenna elements 302, 352 are configured to optimize angular coverage for specific scenarios and environments.

Figure 4:
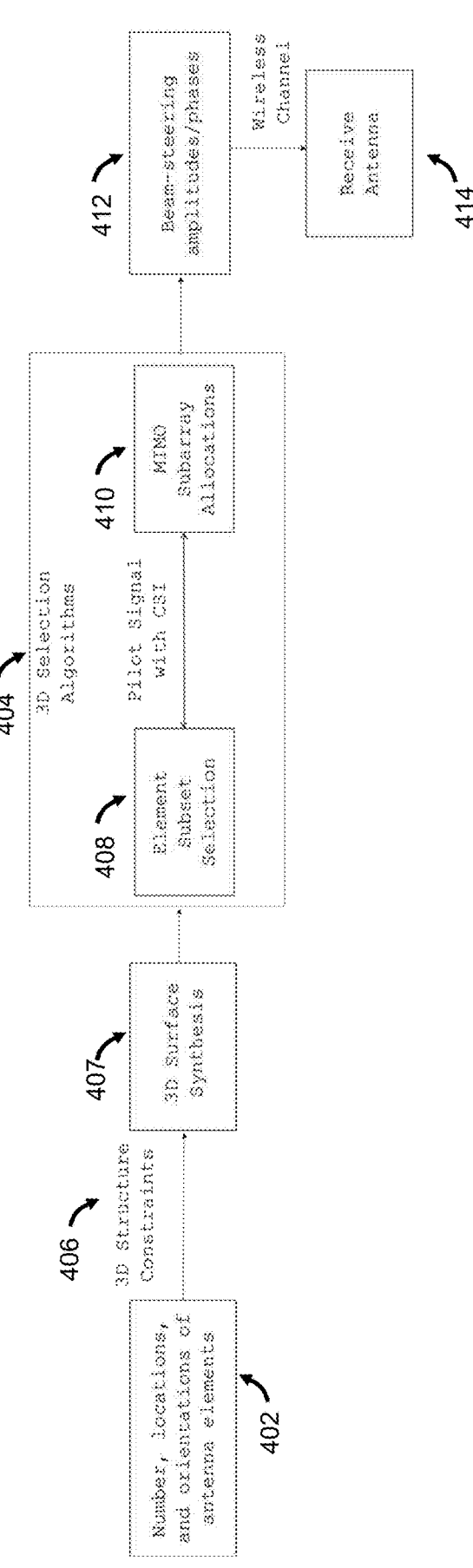
FIG. 4 illustrates a block diagram for downlink transmission, in accordance with an embodiment, including synthesizing surfaces for array antennas.

Referring now to FIG. 4, a block diagram for wireless transmission, in accordance with the present embodiments, is shown. In an example, the input module 72 receives transmit antenna array element requirements 402, for example, number of elements, positions, and orientations, as input via, for example, the input interface 56, the network interface 60, or the database 66. The transmit antenna array requirements 402 have antenna elements positioned in three dimensions. The antenna element configuration can be determined using a 3D element selection 404 by the selection module 74 that imposes constraints 406 with which the antenna surface is synthesized 407. The synthesis 407 can be performed by fitting all the elements according to the matrix representation for polynomial regression which, given the coordinate and orientation vector of the elements $S=(s_1, s_2, \ldots, s_n)$, in which $s_1=(x_i,y_i,z_i,\theta_i,\varphi_i)$, solves the following $p^{th}$ degree polynomial equation (Equation (5)) using a system of equations:

$$f(x, y) = c_0 + c_1 xy + c_2 x^2 y^2 + \ldots + c_p x^p y^p \quad (5)$$

$$\begin{bmatrix} n & \sum_{i=0}^{n} x_i y_i & \sum_{i=0}^{n} x_i^2 y_i^2 & \ldots & \sum_{i=0}^{n} x_i^p y_i^p \\ \sum_{i=0}^{n} x_i y_i & \sum_{i=0}^{n} x_i^2 y_i^2 & \sum_{i=0}^{n} x_i^3 y_i^3 & \ldots & \sum_{i=0}^{n} x_i^{p+1} y_i^{p+1} \\ \sum_{i=0}^{n} x_i^2 y_i^2 & \sum_{i=0}^{n} x_i^3 y_i^3 & \sum_{i=0}^{n} x_i^4 y_i^4 & \ldots & \sum_{i=0}^{n} x_i^{p+2} y_i^{p+2} \\ \vdots & \vdots & \vdots & \ddots & \vdots \\ \sum_{i=0}^{n} x_i^p y_i^p & \sum_{i=0}^{n} x_i^{p+1} y_i^{p+1} & \sum_{i=0}^{n} x_i^{p+2} y_i^{p+2} & \ldots & \sum_{i=0}^{n} x_i^{2p} y_i^{2p} \end{bmatrix} \quad (6)$$

$$\begin{bmatrix} c_0 \\ c_1 \\ c_2 \\ \vdots \\ c_p \end{bmatrix} = \begin{bmatrix} \sum_{i=0}^{n} z_i \\ \sum_{i=0}^{n} z_i x_i y_i \\ \sum_{i=0}^{n} z_i x_i^2 y_i^2 \\ \vdots \\ \sum_{i=0}^{n} z_i x_i^p y_i^p \end{bmatrix}$$

Using the generalized matrix in Equation (6), an overdetermined system is solved by creating a residual function, where summing the square of the residual which forms a surface on the x-y plane. The coefficients can be determined by finding the minima that generates a best-fit surface for antenna element placement.

After surface synthesis 407, the existing structure with a subset of elements is selected 408 to operate under a set of constraints. Various combinations of constraints can be used to make the element selection. In an example, a first constraint can be that, for any concave surface on an antenna, the maximum slope difference between any ON elements is 1.5 to limit destructive interference in the direction of the UE. A second constraint can be that the maximum element spacing between any ON elements is greater than or equal to half the wavelength to limit the effects of antenna coupling and interference. A third constraint is that the number of subarrays is greater than one, up to a maximum number of subarrays equaling the total number of elements to ensure MIMO operation for multiple receiver locations given Channel State Information (CSI). With CSI knowledge from pilot signals, antenna subarrays can be configured 410 to steer beams 412 in the direction of receiver 414 distributions. In some cases, the receiver may form part of a terminal, such as, for example, a mobile phone, a vehicle, or a middle antenna. In some cases, the central MIMO module may operate at baseband, intermediate frequency (IF), or at radio frequency (RF).

Figure 5:
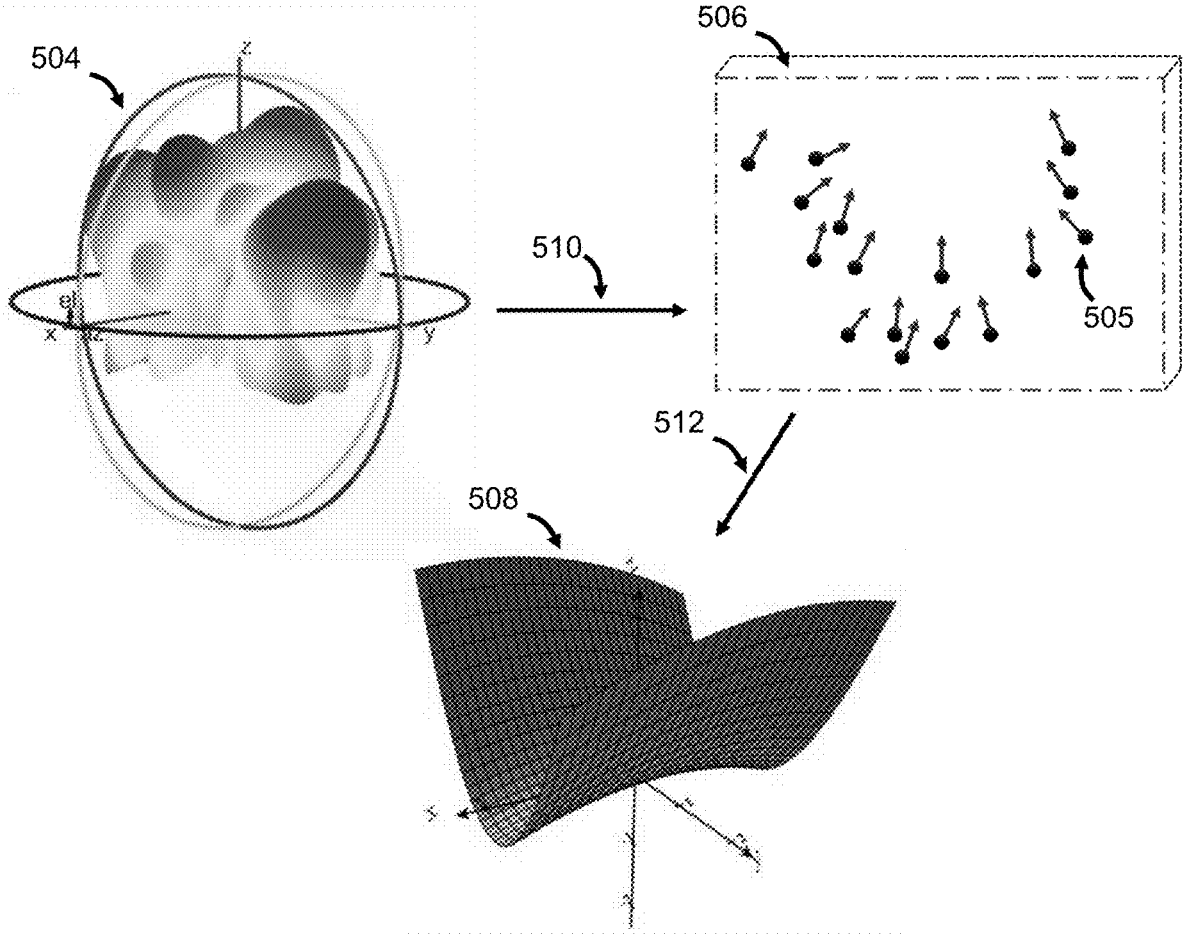
FIG. 5 illustrates an example of surface synthesis from radiation pattern requirements.

FIG. 5 diagrammatically illustrates an example of surface synthesis in accordance with the present embodiments. Desirable radiation properties 504 are those in which a direction and beamwidth of main lobes provide coverage to the maximum number of target users in an environment. Target user distribution and density vary with time and environment multipath fading parameters. A desirable beamwidth of the main lobes can be approximated by selecting the number of antenna elements within a subarray such that less elements produce a wider beamwidth. The directions of the main lobes can be obtained simultaneously by iteratively orienting the individual antenna elements within the subarray and obtaining the combined orientation for the main lobe of each subarray beam pattern until convergence. The finalized element configuration is then a combination of elements 505 divided into subarrays via antenna selection 510, distributed over a range that is confined to a volume represented by a cube 506 having a particular side length, for example, 3 meters. Each element 505 has a position and orientation. Using polynomial regression and constraints 512 with Equation (6), the system 50 can generate a compliant surface 508 for element placement.

FIGS. 6A and 6B illustrate examples of applying antenna element reduction by the reduction module 76 on uniform 64-element 602 and non-uniform 16-element 604 antenna configurations, respectively. In an example, via element reduction iterations, a substantial proportion (>85%) of an originally received signal can be retained by switching 75% of ON antenna elements to OFF antenna elements. This can save power, for example, for the operation of the array antenna outside of peak hours or in non-stationary environments with lesser UE density.

Figures 7A, 7B:
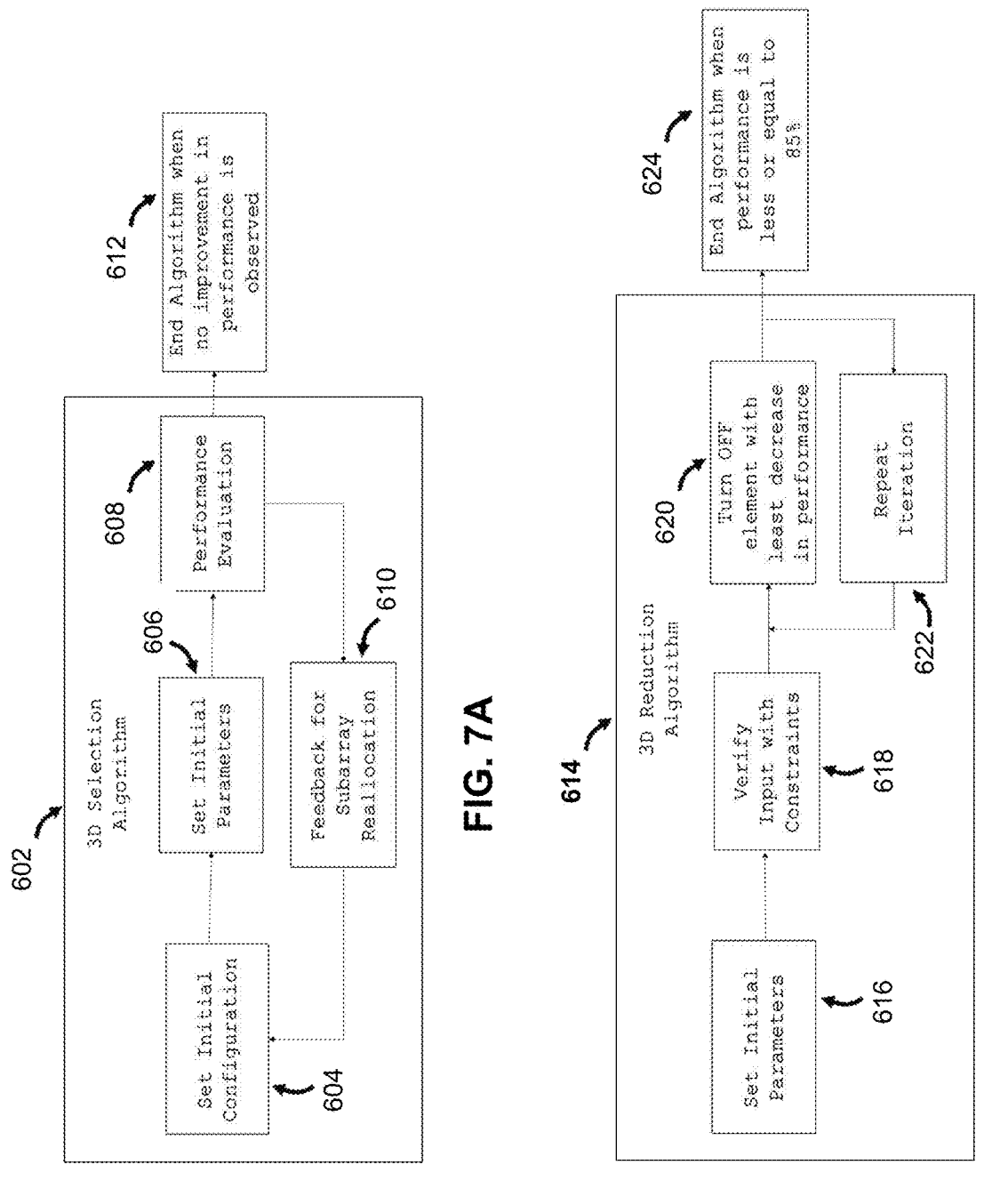
FIG. 7A illustrates a block diagram of an example of a selection of antenna elements, in accordance with an embodiment.
FIG. 7B illustrates a block diagram of an example of a reduction of antenna elements, in accordance with an embodiment.

Referring now to FIG. 7A, a block diagram showing an example of an antenna element selection 702, performed by the selection module 74 to create subarrays, is shown. In some cases, the antenna selection can be used to configure existing antenna array structures with their conformed elements, rather than assigning element locations for synthesized surfaces. Firstly, a predetermined localized configuration for subarray distribution 704 is used to minimize the spatial correlation between elements determined using Equation (2). Then, a number of input parameters 606, received by the input module 72, are set from CSI, from the azimuth and elevation angular distribution of users, and from surface coordinates and orientations. These input parameters 606 are used for beamforming to steer each main lobe towards user angle distributions of interest, as determined using CSI. The angular distribution and resolvability generally depend on the unit angle spatial signature, which is determined using Equation (4). Finally, feedback from the receiver 708 is used to reallocate subarray distribution 710 to increase average UE throughput and capacity using Equation (3), iteratively, until convergence 712. The converged output can be outputted by the output module 78 to the output interface 58, the network interface 60, and/or the database 68.

Referring now to FIG. 7B, a block diagram showing an example of antenna element reduction 714, performed by the reduction module 76, is shown. In some cases, the antenna reduction 714 can be performed by the system 50 after the element selection 702. Firstly, surface coordinates, a number of elements, element coordinates and orientations, and environment and antenna parameters can be inputted 716. The input can be fit or verified 718 against a number of constraints. In an example, the constraints can include:

(1) for any concave surface on an antenna, the maximum slope difference between any ON elements is 1.5 to limit destructive interference in the direction of the UE;

(2) The maximum element spacing between any ON elements is greater than or equal to half the wavelength to limit the effects of antenna coupling and interference;

(3) The number of subarrays is greater than one, up to a maximum number of subarrays equaling the total number of elements to ensure MIMO operation for multiple UE locations given Channel State Information (CSI); and (4) One extra element must be switched OFF at the end of each iteration.

Each antenna element can be sequentially switched OFF and the throughput can be determined per user using Equation (3). The throughput can be determined by comparing it with the initial iteration where all eligible elements that meet the four constraints, above, are turned ON; then, the OFF element with the least decrease in performance can be selected 720. This approach of sequentially switching each element OFF and determining the throughput can be repeated 722 until the iterations are terminated 724. The termination can occur, for example, once overall performance decreases by a given percentage (ex., 15%) compared with the antenna with no elements switched off. The element reduction efficiency can be determined by counting the number of remaining elements that are ON, dividing this count by the total initial elements, and multiplying that division result by 100. The output module 78 can output the element reduction result, in some cases with the element reduction efficiency, to the output interface 58, the network interface 60, and/or the database 68.

The present embodiments advantageously provide, at least, a configurable 3D array antenna in which element placement can be defined across an arbitrary three-dimensional surface in view of a set of constraints regarding, one or more of, beamforming, coupling, and interference. The antenna elements can be used to simultaneously transmit or receive multiple signals and can be grouped to create desired beam properties. A beam is desirable when added constructively at particular angles in the direction of multiple users. Advantageously, the number of operating elements can be reduced to maintain power efficiency without degradation in performance. Advantageously, the array antenna of the present embodiments can be capable of adapting to different environments and channel characteristics while providing wider angular coverage and versatility. The present embodiments can be applied to, for example, base stations, middle antennas, or user equipment.

Although the foregoing has been described with reference to certain specific embodiments, various modifications thereto will be apparent to those skilled in the art without departing from the spirit and scope of the invention as outlined in the appended claims. The entire disclosures of all references recited above are incorporated herein by reference.

The invention claimed is:

1. An array antenna comprising a plurality of antenna elements, the antenna elements arranged over a three-dimensional surface, the antenna elements are determined to be active based on meeting constraints during iterative antenna element reduction, the constraints comprising at least one of:

for concave portions of the surface, a maximum slope difference between active antenna elements is less than a predetermined value;

a maximum element spacing between active antenna elements is greater than or equal to half a wavelength of a signal propagating or received at the respective antenna elements; and for antenna elements grouped into subarrays that each transmit a unique data stream, the number of subarrays being between two and a maximum number of subarrays, the maximum number of subarrays comprising a total number of antenna elements that provide multiple-input and multiple-output (MIMO) operation for multiple locations, wherein, at each iteration, each antenna element is sequentially inactivated, and after the iterations are terminated, the antenna element having the least decrease in performance for the array antenna when inactivate is selected to be inactivated.

2. The antenna array of claim 1, wherein the three-dimensional surface is synthesized by fitting all the antenna elements according to a polynomial regression.

3. The antenna array of claim 2, wherein the polynomial regression has the form:

$$f(x,y)=c_0+c_1xy+c_2x^2y^2+\ldots+c_px^py^p,$$

and where summing a square of a residual function forms a surface on an x-y plane.

4. The antenna array of claim 1, wherein antenna elements are further determined to be active by:

minimizing a spatial correlation between antenna elements;

receiving input parameters that are determined from channel state information, from azimuth and elevation angular distribution, and from surface coordinates and orientations of the antenna elements; and reallocating subarray distribution to increase average throughput and capacity based on feedback from a receiver.

5. The antenna array of claim 4, wherein the angular distribution is determined based on a unit angle spatial signature.

6. The array antenna of claim 1, wherein the constraints are based on inputted values comprising at least one of coordinates of the three-dimensional surface, a number of antenna elements, antenna element coordinates and orientations, environment parameters, and antenna element parameters.

7. The array antenna of claim 1, wherein, during each iteration, while each antenna element is sequentially inactivated, a throughput of the array antenna is determined, the throughput determined by comparison with an initial iteration comprising all antenna elements that meet the constraints.

8. The array antenna of claim 7, wherein the iterations are terminated when overall performance of the antenna array decreases by a predetermined percentage in comparison to the antenna array with no antenna elements inactivated.

9. The array antenna of claim 1, wherein the predetermined value for the maximum slope difference is 1.5.

10. A method for configuring an array antenna, the antenna array comprising a plurality of antenna elements, the antenna elements arranged over a three-dimensional surface, the method executed on a processing unit, the method comprising receiving inputted values, determining a configuration of the antenna elements to be active based on meeting constraints during iterative antenna element reduction, and outputting the configuration, the constraints comprising at least one of:

for concave portions of the surface, a maximum slope difference between active antenna elements is less than a predetermined value;

a maximum element spacing between active antenna elements is greater than or equal to half a wavelength of a signal propagating or received at the respective antenna elements; and for antenna elements grouped into subarrays that each transmit a unique data stream, the number of subarrays being between two and a maximum number of subarrays, the maximum number of subarrays comprising a total number of antenna elements that provide multiple-input and multiple-output (MIMO) operation for multiple locations, wherein, at each iteration, each antenna element is sequentially inactivated, and after the iterations are terminated, the antenna element having the least decrease in performance for the array antenna when inactivate is selected to be inactivated.

11. The method of claim 10, further comprising synthesizing the three-dimensional surface by fitting all the antenna elements according to a polynomial regression.

12. The method of claim 11, wherein the polynomial regression has the form:

$$f(x,y) = c_0 + c_1 xy + c_2 x^2 y^2 + \ldots + c_p x^p y^p,$$

and where summing a square of a residual function forms a surface on an x-y plane.

13. The method of claim 10, wherein antenna elements are determined to be active by:

minimizing a spatial correlation between antenna elements;

receiving input parameters that are determined from channel state information, from azimuth and elevation angular distribution, and from surface coordinates and orientations of the antenna elements; and reallocating subarray distribution to increase average throughput and capacity based on feedback from a receiver.

14. The method of claim 13, wherein the angular distribution is determined based on a unit angle spatial signature.

15. The method of claim 10, wherein the inputted values comprise at least one of coordinates of the three-dimensional surface, a number of antenna elements, antenna element coordinates and orientations, environment parameters, and antenna element parameters.

16. The method of claim 10, wherein, during each iteration, while each antenna element is sequentially inactivated, a throughput of the array antenna is determined, the throughput determined by comparison with an initial iteration comprising all antenna elements that meet the constraints.

17. The method of claim 16, wherein the iterations are terminated when overall performance of the antenna array decreases by a predetermined percentage in comparison to the antenna array with no antenna elements inactivated.

18. The method of claim 10, wherein the predetermined value for the maximum slope difference is 1.5.

* * * * *